US009109613B2

(12) United States Patent
Ito

(10) Patent No.: US 9,109,613 B2
(45) Date of Patent: Aug. 18, 2015

(54) BRAKING-FORCE GENERATOR

(71) Applicant: HONDA MOTOR CO., LTD., Minato-ku, Tokyo (JP)

(72) Inventor: Yuki Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 221 days.

(21) Appl. No.: 13/943,079

(22) Filed: Jul. 16, 2013

(65) Prior Publication Data

US 2014/0020377 A1    Jan. 23, 2014

(30) Foreign Application Priority Data

Jul. 17, 2012    (JP) ................................. 2012-158339

(51) Int. Cl.
| | |
|---|---|
| *F15B 15/00* | (2006.01) |
| *B60T 13/14* | (2006.01) |
| *B60T 13/66* | (2006.01) |
| *B60T 13/74* | (2006.01) |
| *B60T 8/40* | (2006.01) |
| *B60T 8/94* | (2006.01) |

(52) U.S. Cl.
CPC ............... *F15B 15/00* (2013.01); *B60T 8/4081* (2013.01); *B60T 13/147* (2013.01); *B60T 13/662* (2013.01); *B60T 13/745* (2013.01); *B60T 8/94* (2013.01)

(58) Field of Classification Search
CPC ......... F15B 15/00; B60T 8/4081; B60T 8/94; B60T 13/745; B60T 13/147; B60T 13/662
See application file for complete search history.

(56) References Cited

U.S. PATENT DOCUMENTS

| | | | |
|---|---|---|---|
| 6,604,795 B2 * | 8/2003 | Isono et al. ..................... | 303/11 |
| 7,942,483 B2 | 5/2011 | Hatano | |

(Continued)

FOREIGN PATENT DOCUMENTS

| | | |
|---|---|---|
| CN | 102211571 A | 10/2011 |
| DE | 10 2007 006 545 A1 | 8/2007 |

(Continued)

OTHER PUBLICATIONS

Japanese Office Action (Notification of Reasons for Refusal) issued over counterpart JP Patent Application 2012-158339, sent on Feb. 25, 2014.

(Continued)

*Primary Examiner* — Michael J Zanelli
(74) *Attorney, Agent, or Firm* — Carrier Blackman & Associates, P.C.; William D. Blackman; Joseph P. Carrier

(57) ABSTRACT

In a braking-force generator: a master cylinder generates first braking force corresponding to an operational input through a manipulator; a hydraulic-pressure generator connected to the master cylinder through a shutoff valve generates second braking force corresponding to the operational input through the manipulator when the shutoff valve is closed; an abnormality detector repeatedly determines whether or not an operational state of the hydraulic-pressure generator is abnormal; and a controller prohibits generation of the second braking force, opens the shutoff valve, and transmits the first braking force to the hydraulic-pressure generator, when the operational state is abnormal. In the case where the abnormality detector determines that the operational state changes from an abnormal state to a normal state while manipulation with the manipulator is being performed, the controller keeps prohibition of the generation of the second braking force and keeps the shutoff valve open until the manipulation is terminated.

4 Claims, 7 Drawing Sheets

(56) References Cited

U.S. PATENT DOCUMENTS

| | | |
|---|---|---|
| 8,496,301 B2 | 7/2013 | Ohkubo et al. |
| 8,695,478 B2 | 4/2014 | Feick et al. |
| 2007/0182244 A1* | 8/2007 | Hatano ................ 303/116.1 |
| 2008/0223675 A1* | 9/2008 | Hatano ................ 188/345 |
| 2011/0316328 A1* | 12/2011 | Hatano ................ 303/10 |
| 2012/0000738 A1* | 1/2012 | Inoue et al. .......... 188/106 P |
| 2012/0313427 A1* | 12/2012 | Nishioka et al. ........ 303/10 |

FOREIGN PATENT DOCUMENTS

| | | |
|---|---|---|
| DE | 10 2006 059 949 A1 | 12/2007 |
| JP | 03-189272 A | 8/1991 |
| JP | 2006-306326 A | 11/2006 |
| JP | 2009-90879 * | 4/2009 |
| JP | 2009-137376 A | 6/2009 |
| WO | 2010/107067 A1 | 9/2010 |
| WO | 2012/056862 A1 | 5/2012 |

OTHER PUBLICATIONS

Office Action issued on Nov. 28, 2014 by the German Patent Office for corresponding DE Patent Application 10 2013 214 004.5.

Office Action issued on Apr. 21, 2015 in the corresponding Chinese Patent Application No. 201310299693.4 and the English translation thereof.

* cited by examiner

BRAKING-FORCE GENERATOR

CROSS-REFERENCE TO RELATED APPLICATIONS

This application claims the foreign priority benefit under 35 U.S.C. §119 of Japanese Patent Application No. 2012-158339, filed on Jul. 17, 2012, the disclosure of which is incorporated herein by reference.

BACKGROUND OF THE INVENTION

1. Field of the Invention

The present invention relates to a braking-force generator which generates braking force corresponding to an electric signal generated on the basis of an operational input by an operator.

2. Description of the Related Art

The braking-force generator does not need direct exertion of the force produced by the driver as braking force for a vehicle, and can realize the so-called brake-by-wire (BBW) system. (See, for example, Japanese Registered Patent No. 4801823.)

In the past, generally, when an abnormality occurs in a device such as the braking-force generator, it was difficult for the device to solve the abnormality by itself. However, currently, as in the typical case where the artificial intelligence is used, the device can solve by itself an abnormality occurring in the device, so that the device can be restored to the normal state. The braking-force generator diagnoses by itself the braking-force generator for abnormality. When the braking-force generator makes a diagnosis of an abnormality, the braking-force generator takes a measure for solving the abnormality, so that the braking-force generator can be restored to the normal state. When the braking-force generator diagnoses by itself the braking-force generator for abnormality again after taking the above measure, and determines that the abnormality is solved and the braking-force generator is in the normal state (i.e., the abnormality is solved), it is possible to determine whether or not the braking-force generator is restored to the normal state. A conceivable example of an abnormality in the braking-force generator which can be automatically restored is a dislocation of a piston (and a push rod for pushing the piston and a motor for sliding the push rod). In order to generate the braking force with high precision, it is desirable that the dislocation be minimized. In this case, it is possible to determine that an abnormality occurs when the dislocation is equal to or greater than a predetermined value. That is, the capability of automatically solving an abnormality and automatically keeping the dislocation below a predetermined value is considered to be useful for generating the braking force with high precision.

The braking-force generator generates the braking force by a servo mechanism. The servo mechanism makes the generated braking force follow target values which are successively set. However, when an abnormality occurs in the braking-force generator, the servo mechanism needs to be temporarily prohibited (stopped) in order to perform operations for automatically recovering from the abnormality. After the abnormality is solved, the operation of the servo mechanism is restarted. At the time at which the operation of the servo mechanism is restarted, the driver may or may not be pushing the brake pedal. If the operation of the servo mechanism is restarted when the driver is not pushing the brake pedal, the braking force increases regardless of the intention of the driver, so that the driver will feel a sense of incongruity.

In view of above, the object of the present invention is to provide a braking-force generator which does not cause the driver to feel a sense of incongruity even when the braking-force generator performs an operation for automatically recovering from an abnormality.

SUMMARY OF THE INVENTION

In order to accomplish the above object, a braking-force generator according to the first aspect of the present invention is provided. The braking-force generator according to the first aspect of the present invention includes: a master cylinder which generates first braking force corresponding to an operational input through a manipulator (e.g., a brake pedal); a hydraulic-pressure generating means which is connected to the master cylinder through a shutoff valve in such a manner that the hydraulic-pressure generating means can be shut off from the master cylinder, and generates second braking force corresponding to the operational input through the manipulator when the hydraulic-pressure generating means is shut off from the master cylinder; an abnormality determination means which repeatedly determines whether or not an operational state of the hydraulic-pressure generating means is abnormal; and a control means which prohibits generation of the second braking force by the hydraulic-pressure generating means, opens the shutoff valve, and transmits to the hydraulic-pressure generating means the first braking force generated by the master cylinder, when the operational state of the hydraulic-pressure generating means is determined to be abnormal. The braking-force generator is characterized in that in the case where the abnormality determination means determines that the operational state of the hydraulic-pressure generating means changes from an abnormal state to a normal state while manipulation with the manipulator is being performed, the control means keeps prohibition of the generation of the second braking force by the hydraulic-pressure generating means and keeps the shutoff valve open until the manipulation is terminated.

According to the first aspect of the present invention, as described above, even when the operational state of the hydraulic-pressure generating means changes from an abnormal state to a normal state while manipulation with the manipulator (e.g., a brake pedal) is being performed, the generation of the second braking force by the hydraulic-pressure generating means is prohibited until the manipulation is terminated. Therefore, the braking force which is actually exerted on the wheels of the vehicle does not increase regardless of the intention of the operator (driver), and the operator (driver) will not feel a sense of incongruity.

Preferably, the braking-force generator according the first aspect of the present invention further includes a braking-force assist device which generates auxiliary braking force for supplementing the first braking force generated by the master cylinder when the operational state of the hydraulic-pressure generating means is determined to be abnormal, and in the case where the manipulation with the manipulator is being performed when the abnormality determination means determines that the operational state of the hydraulic-pressure generating means changes from the abnormal state to the normal state, the braking-force assist device keeps generation of the auxiliary braking force until the manipulation is terminated.

In the above case, even when the operational state of the hydraulic-pressure generating means changes from an abnormal state to a normal state while manipulation with the manipulator (e.g., a brake pedal) is being performed, the braking-force assist device keeps generation of the auxiliary braking force until the manipulation is terminated. Therefore, the total braking force which is actually exerted on the wheels of the vehicle does not vary (decrease) regardless of the intention of the operator (driver), and the operator (driver) will not feel a sense of incongruity.

Preferably, the control means keeps prohibition of the generation of the second braking force until the operator is detached from the manipulator.

When the generation of the second braking force (by a servo mechanism) is restarted, the braking force increases. However, the reaction force applied to the manipulator (e.g., a brake pedal) also increases, i.e., the so-called kickback occurs. Nevertheless, in the case where the servo mechanism is not restarted until the operator is detached from the manipulator, the kickback does not reach the driver, so that the driver will not feel a sense of incongruity.

In order to accomplish the above object, a braking-force generator according to the second aspect of the present invention is provided. The braking-force generator according to the second aspect of the present invention includes: a master cylinder which generates first braking force corresponding to an operational input through a manipulator (e.g., a brake pedal); a hydraulic-pressure generating means which is connected to the master cylinder through a shutoff valve in such a manner that the hydraulic-pressure generating means can be shut off from the master cylinder, and generates second braking force corresponding to the operational input through the manipulator when the hydraulic-pressure generating means is shut off from the master cylinder; an abnormality determination means which repeatedly determines whether or not an operational state of the hydraulic-pressure generating means is abnormal; and a control means which prohibits generation of the second braking force by the hydraulic-pressure generating means, opens the shutoff valve, and transmits to the hydraulic-pressure generating means the first braking force generated by the master cylinder, when the operational state of the hydraulic-pressure generating means is determined to be abnormal. The braking-force generator is characterized in that in the case where the abnormality determination means determines that the operational state of the hydraulic-pressure generating means changes from an abnormal state to a normal state while manipulation with the manipulator is being performed, the control means keeps the shutoff valve open, and makes the hydraulic-pressure generating means generate third braking force which is smaller than the second braking force generated when the shutoff valve is closed, until the manipulation is terminated.

According to the second aspect of the present invention, the braking-force generator can generate the braking force by the hydraulic-pressure generating means immediately after the abnormality determination means determines that the operational state of the hydraulic-pressure generating means changes from an abnormal state to a normal state. In addition, since the third braking force generated by the hydraulic-pressure generating means is weak, the braking force which the driver feels does not greatly increase, so that the sense of incongruity which the driver feels can be suppressed.

Thus, according to the present invention, it is possible to provide a braking-force generator which does not cause the driver to feel a sense of incongruity even when the braking-force generator is automatically restored from an abnormality.

DETAILED DESCRIPTION OF THE INVENTION

The first to third embodiments of the present invention are explained below with reference to accompanying drawings. In the following explanations, identical or equivalent components or constituents are indicated by the same reference numbers, and identical explanations are not repeated unless necessary.

1. First Embodiment 1.1 Outline of Structure

Figure 1:
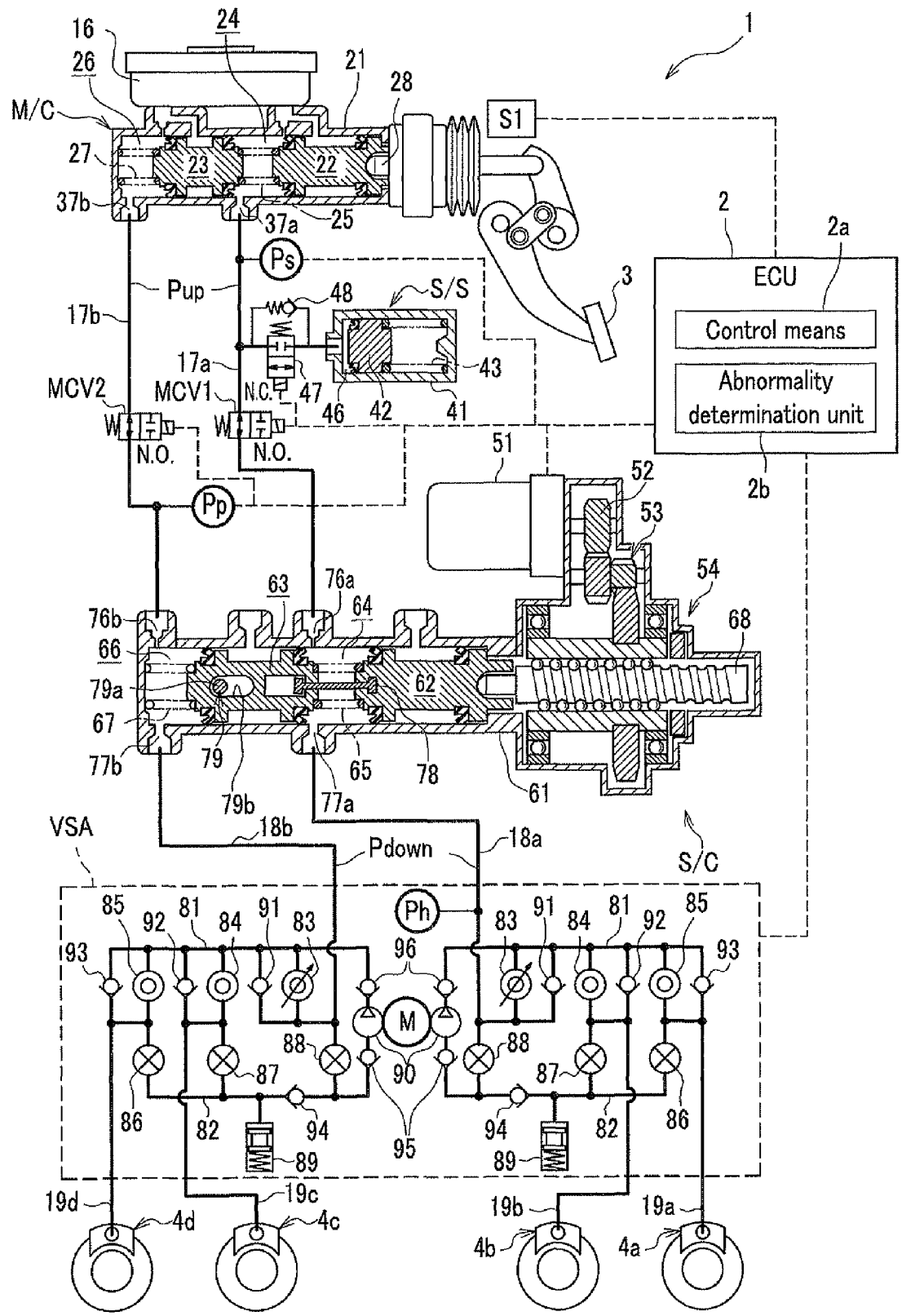
FIG. 1 is a block-diagram illustrating a braking-force generator according to a first embodiment of the present invention.

FIG. 1 is a block-diagram illustrating the braking-force generator 1 according to the first embodiment of the present invention. The braking-force generator 1 contains a brake pedal 3, wheel cylinders 4a, 4b, 4c, and 4d, a tandem-type master cylinder M/C, first hydraulic routes 17a-18a-19a and 17a-18a-19b respectively constituted by the hydraulic paths 17a, 18a, and 19a and the hydraulic paths 17a, 18a, and 19b, and second hydraulic routes 17b-18b-19c and 17b-18b-19d respectively constituted by the hydraulic paths 17b, 18b, and 19c and the hydraulic paths 17b, 18b, and 19d. The master cylinder M/C can generate hydraulic pressure by a driver's manipulation with the brake pedal 3. The hydraulic paths constituting the first hydraulic routes 17a-18a-19a and 17a-18a-19b connect a first hydraulic chamber 24 in the master cylinder M/C and the master cylinders 4a and 4b, and the hydraulic paths constituting the second hydraulic routes 17b-18b-19c and 17b-18b-19d connect a second hydraulic chamber 26 in the master cylinder M/C and the master cylinders 4c and 4d.

The master cylinder M/C includes a cylinder 21 and first and second pistons 22 and 23. The first and second pistons 22 and 23 are slidably fitted into the cylinder 21. A first return spring 25 is arranged in the first hydraulic chamber 24, which is formed (by partitioning with the first and second pistons 22 and 23) on the front side of the first piston 22. In addition, a second return spring 27 is arranged in the second hydraulic chamber 26, which is formed (by partitioning with the second piston 23) on the front side of the second piston 23. The rear end of the first piston 22 is connected to the brake pedal 3 through a push rod 28. When the driver pushes the brake pedal 3, the first and second pistons 22 and 23 move forward and upstream hydraulic pressure Pup is generated in the first hydraulic chamber 24 and the second hydraulic chamber 26. The cylinder 21 is connected to a reservoir 16. The hydraulic path 17a constituting the first hydraulic routes is connected to an output port 37a, and the hydraulic path 17b constituting the second hydraulic routes is connected to an output port 37b.

The braking-force generator 1 contains a slave cylinder S/C as the hydraulic-pressure generating means. The slave cylinder S/C is arranged between the hydraulic paths 17a and 18a constituting the first hydraulic routes and between the hydraulic paths 17b and 18b constituting the second hydraulic routes. The slave cylinder S/C is configured to be able to generate downstream hydraulic pressure Pdown in the first and second hydraulic routes on the basis of the amount of manipulation of the brake pedal 3. A control means 2a and an abnormality determination unit 2b are realized in the ECU (engine control unit) 2. The control means 2a sets a target value of the downstream hydraulic pressure Pdown on the basis of the amount of manipulation of the brake pedal 3 (measured by a stroke sensor S1), and controls the downstream hydraulic pressure Pdown on the basis of the target value. Specifically, the target value is set on the basis of the ratio between the regenerative braking force (generated by regenerative braking) and the hydraulic braking force exerted through the wheel cylinders 4a, 4b, 4c, and 4d. The braking-force generator 1 determines the amount of actuation of first and second pistons 62 and 63 in the slave cylinder S/C (i.e., the amount of rotation of a motor 51) for the target value of the downstream hydraulic pressure Pdown on the basis of a correspondence relationship between the target value and the amount of the actuation (i.e., the amount of the rotation), and generates the downstream hydraulic pressure Pdown on the basis of the determined amount of the actuation (i.e., the amount of the rotation). The abnormality determination unit 2b realized in the ECU 2 will be explained later. The slave cylinder S/C contains a cylinder 61 and the first and second pistons 62 and 63 (which are slave pistons). The first and second pistons 62 and 63 are slidably fitted into the cylinder 61. A first return spring 65 is arranged in a first hydraulic chamber 64, which is formed (by partitioning with the first and second pistons 62 and 63) on the front side of the first piston 62. In addition, a second return spring 67 is arranged in a second hydraulic chamber 66, which is formed (by partitioning with the second piston 63) on the front side of the second piston 63. The rear end of the first piston 62 is connected to the motor 51 through a push rod 68, a ball-screw mechanism 54, a deceleration mechanism 53, and a gear 52. When the motor 51 rotates, the push rod 68 and the first and second pistons 62 and 63 are driven to move forward, so that downstream hydraulic pressure Pdown is generated in the first and second hydraulic chambers 64 and 66. In addition, a limiting means 78 limits the maximum and minimum distances between the first piston 62 and the second piston 63. Further, a limiting means 79 limits the movable range of the second piston 63. The limiting means 79 is realized by an elongate hole 79b and a pin 79a, where the elongate hole 79b is formed inside the second piston 63, and the pin 79a is fixed to the inner wall of the cylinder 61 and engaged with the elongate hole 79b.

In the cylinder 61, a first input port 76a, a first output port 77a, a second input port 76b, and a second output port 77b are formed in this order from the rear side to the front side, where the first input port 76a and the first output port 77a are formed as openings of the first hydraulic chamber 64, and the second input port 76b and the second output port 77b are formed as openings of the second hydraulic chamber 66. The hydraulic path 17a constituting the first hydraulic routes is connected to the first input port 76a and communicates with the first hydraulic chamber 64, and the hydraulic path 17b constituting the second hydraulic routes is connected to the second input port 76b and communicates with the second hydraulic chamber 66. Specifically, the first input port 76a is connected to the first hydraulic chamber 24 in the master cylinder M/C through a master-cut valve MCV1 in such a manner that the first input port 76a can be shut off from the first hydraulic chamber 24. In addition, the second input port 76b is connected to the second hydraulic chamber 26 in the master cylinder M/C through a master-cut valve MCV2 in such a manner that the second input port 76b can be shut off from the second hydraulic chamber 26. The hydraulic path 18a constituting the first hydraulic routes is connected to the first output port 77a and communicates with the first hydraulic chamber 64, and the hydraulic path 18b constituting the second hydraulic routes is connected to the second output port 77b and communicates with the second hydraulic chamber 66. The position of the first output port 77a is near to the position of the first input port 76a in the axial direction of the cylinder 61. Therefore, when an abnormality occurs in the braking-force generator 1 (i.e., when the abnormality determination unit 2b determines an abnormality of the slave cylinder S/C), the upstream hydraulic pressure Pup transmitted through the first input port 76a can be further transmitted as the downstream hydraulic pressure Pdown to the first output port 77a without transmission loss. Similarly, the position of the second output port 77b is near to the position of the second input port 76b in the axial direction of the cylinder 61. Therefore, when an abnormality occurs in the braking-force generator 1 (i.e., when the abnormality determination unit 2b determines an abnormality of the slave cylinder S/C), the upstream hydraulic pressure Pup transmitted through the second input port 76b can be further transmitted as the downstream hydraulic pressure Pdown to the second output port 77b without transmission loss.

In addition, the braking-force generator 1 contains a vehicle stability assist[a] (VSA"), which is disposed between the slave cylinder S/C and the wheel cylinders 4a, 4b, 4c, and 4d. Specifically, a first part of the VSA is disposed between the hydraulic path 18a and the hydraulic paths 19a and 19b in the first hydraulic routes, and a second part of the VSA is disposed between the hydraulic path 18b and the hydraulic paths 19c and 19d in the second hydraulic routes. The construction of the first part of the VSA for the first hydraulic routes is identical to the construction of the second part of the VSA for the second hydraulic routes. Therefore, for ease of understanding, the corresponding constituent elements in the first and second parts bear the same reference numbers, and the first part of the VSA disposed between the hydraulic path 18a and the hydraulic paths 19a and 19b in the first hydraulic routes is mainly explained below.

The first (or second) part of the VSA contains hydraulic paths 81 and 82, which are common to the wheel cylinders 4a and 4b (or to the wheel cylinders 4c and 4d). In addition, the first (or second) part of the VSA contains a (normally-open) regulator valve 83, a check valve 91, a (normally-open) in-valve 85, a check valve 93, a (normally-open) in-valve 84, a check valve 92, a (normally-closed) out-valve 86, a (normally-closed) out-valve 87, a reservoir 89, a check valve 94, a pump 90, check valves 95 and 96, a motor M, and a (normally-closed) suction valve 88. The regulator valve 83 is a normally-closed solenoid valve which is arranged between the hydraulic path 18a (or 18b) and the hydraulic path 81, and the opening of the regulator valve 83 can be varied. The check valve 91 is arranged in parallel with the regulator valve 83, and allows the brake fluid to flow from the hydraulic path 18a (or 18b) to the hydraulic path 81. The in-valve 85 is a normally-open solenoid valve which is arranged between the hydraulic path 81 and the hydraulic path 19a (or 19d). The check valve 93 is arranged in parallel with the in-valve 85, and allows the brake fluid to flow from the hydraulic path 19a (or 19d) to the hydraulic path 81. The in-valve 84 is a normally-open solenoid valve which is arranged between the hydraulic path 81 and the hydraulic path 19b (or 19c). The check valve 92 is arranged in parallel with the in-valve 84, and allows the brake fluid to flow from the hydraulic path 19b (or 19c) to the hydraulic path 81. The out-valve 86 is a normally-closed solenoid valve which is arranged between the hydraulic path 19a (or 19d) and the hydraulic path 82. The out-valve 87 is a normally-closed solenoid valve which is arranged between the hydraulic path 19b (or 19c) and the hydraulic path 82. The reservoir 89 is connected to the hydraulic path 82. The check valve 94 is arranged between the hydraulic paths 82 and 81, and allows the brake fluid to flow from the hydraulic path 82 to the hydraulic path 81. The pump 90 is arranged between the check valve 94 and the hydraulic path 81, and supplies the brake fluid from the hydraulic path 82 to the hydraulic path 81. The check valves 95 and 96 are respectively arranged on the front and back sides of the pump 90, and allow the brake fluid to flow from the hydraulic path 82 to the hydraulic path 81. The motor M drives the pump 90. The suction valve 88 is a normally-closed solenoid valve which is arranged between the hydraulic path 18a (or 18b) and an intermediate point between the check valves 94 and 95. In addition, a pressure sensor Ph is arranged on the hydraulic path 18a in the VSA, and detects the downstream hydraulic pressure Pdown generated in the slave cylinder S/C.

The vehicle stability assist VSA is a control system for stabilization of the vehicle motion. In the VSA, mainly, a system for ABS (antiskid braking system) for preventing the wheels from locking under braking, a system for TCS (traction control system) for preventing the wheels from running idle under acceleration, and a system for suppression of skids occurring during cornering are integrated. The VSA is controlled by the control means 2a in the ECU 2 so as to serve the functions of the above three systems.

In addition, the braking-force generator 1 contains the master cut valves MCV1 and MCV2, which are normally-open (N.O.) shutoff valves. The master cut valve MCV1 is arranged in the hydraulic path 17a (in the first hydraulic routes) between the first hydraulic chamber 24 in the master cylinder M/C and the first hydraulic chamber 64 in the slave cylinder S/C (the first slave hydraulic chamber), and the master cut valve MCV2 is arranged in the hydraulic path 17b (in the second hydraulic routes) between the second hydraulic chamber 26 in the master cylinder M/C and the second hydraulic chamber 66 in the slave cylinder S/C (the second slave hydraulic chamber).

During normal operation of the braking-force generator 1 (i.e., when the abnormality determination unit 2b determines that the slave cylinder S/C is in a normal state), the master cut valves MCV1 and MCV2 are closed, so that the upstream hydraulic pressure Pup generated in the master cylinder M/C is not directly transmitted to the wheel cylinders 4a, 4b, 4c, and 4d through the brake fluid, and the downstream hydraulic pressure Pdown which is electrically generated in the slave cylinder S/C on the basis of the amount of manipulation of the brake pedal 3 by the driver (corresponding to the upstream hydraulic pressure Pup) is transmitted to the wheel cylinders 4a, 4b, 4c, and 4d through the hydraulic paths 18a, 18b, 19a, 19b, 19c, and 19d so as to actuate the wheel cylinders 4a, 4b, 4c, and 4d. That is, the wheel cylinders 4a, 4b, 4c, and 4d are actuated by the so-called brake-by-wire (BBW) system. The braking-force generator 1 configured as above can be controlled in cooperation with a regenerative braking apparatus, which is used in electric automobiles or cars. Specifically, when the downstream hydraulic pressure Pdown corresponding to the braking force which is determined by subtracting the braking force generated by the regenerative braking apparatus, from the braking force corresponding to the upstream hydraulic pressure Pup is generated, it is possible to brake the vehicle without causing the driver to feel a sense of incongruity.

On the other hand, when (the abnormality determination unit 2b determines that) the slave cylinder S/C is in an abnormal state, the master cut valves MCV1 and MCV2 are opened, so that the upstream hydraulic pressure Pup generated in the master cylinder M/C is directly transmitted to the wheel cylinders 4a, 4b, 4c, and 4d through the brake fluid so as to actuate the wheel cylinders 4a, 4b, 4c, and 4d. Thus, a fail-safe system is realized.

The braking-force generator 1 contains pressure sensors Pp and Ps. The pressure sensor Pp is arranged at a location downstream (i.e., on the wheel cylinders 4c, 4d side) of the master cut valve MCV2 on the hydraulic path 17b (in the second hydraulic routes), and can detect (measure) the downstream hydraulic pressure Pdown at the location downstream of the master cut valve MCV2 on the hydraulic path 17b. The pressure sensor Ps is arranged at a location upstream (i.e., on the master cylinder M/C side) of the master cut valve MCV1 on the hydraulic path 17a (in the second hydraulic routes), and can detect (measure) the upstream hydraulic pressure Pup at the location upstream of the master cut valve MCV1 on the hydraulic path 17a.

In addition, the braking-force generator 1 contains a stroke simulator S/S. The stroke simulator S/S is arranged at a location upstream (i.e., on the master cylinder M/C side) of the master cut valve MCV1 on the hydraulic path 17a (in the second hydraulic routes), and can absorb the brake fluid flowing out of the first hydraulic chamber 24 in the master cylinder M/C. A return spring 43, which pushes a piston 42, is arranged in the stroke simulator S/S in order to realize a pushing feeling of the brake pedal 3 which is equivalent to the conventional braking system. A hydraulic chamber 46 is formed (by partitioning with the piston 42) on the side of the piston 42 opposite to the return spring 43 in the cylinder 41. The hydraulic chamber 46 is connected to the hydraulic path 17a (constituting the first hydraulic routes) through a normally-closed (N.C.) shutoff valve (PFSV) 47. (PFSV stands for the pressure fail-safe valve.) A check valve 48 is connected in parallel with the shutoff valve (PFSV) 47. The check valve 48 allows the brake fluid to flow from the hydraulic chamber 46 to the hydraulic path 17a (constituting the first hydraulic routes), and does not allow the brake fluid to flow in the opposite direction. The shutoff valve (PFSV) 47 is opened when the master cut valve MCV1 is closed (i.e., when the braking-force generator 1 is in normal operation). Therefore, the brake fluid which flows out of the first hydraulic chamber 24 in the master cylinder M/C when the brake pedal 3 is pushed flows into the hydraulic chamber 46, and generates pedal reaction force, so that the driver will not feel a sense of incongruity. On the other hand, when the braking-force generator 1 is in an abnormal state, both of the master cut valves MCV1 and MCV2 are opened and the shutoff valve (PFSV) 47 is closed, so that the brake fluid which flows out of the first hydraulic chamber 24 in the master cylinder M/C when the brake pedal 3 is pushed flows into the slave cylinder S/C (which behaves as a hydraulic pressure source) instead of the stroke simulator S/S. Therefore, the upstream hydraulic pressure Pup generated in the master cylinder M/C is transmitted to the slave cylinder S/C, and is further transmitted to the wheel cylinders 4a, 4b, 4c, and 4d to actuate the wheel cylinders 4a, 4b, 4c, and 4d.

1.2 Operations

Figure 2:
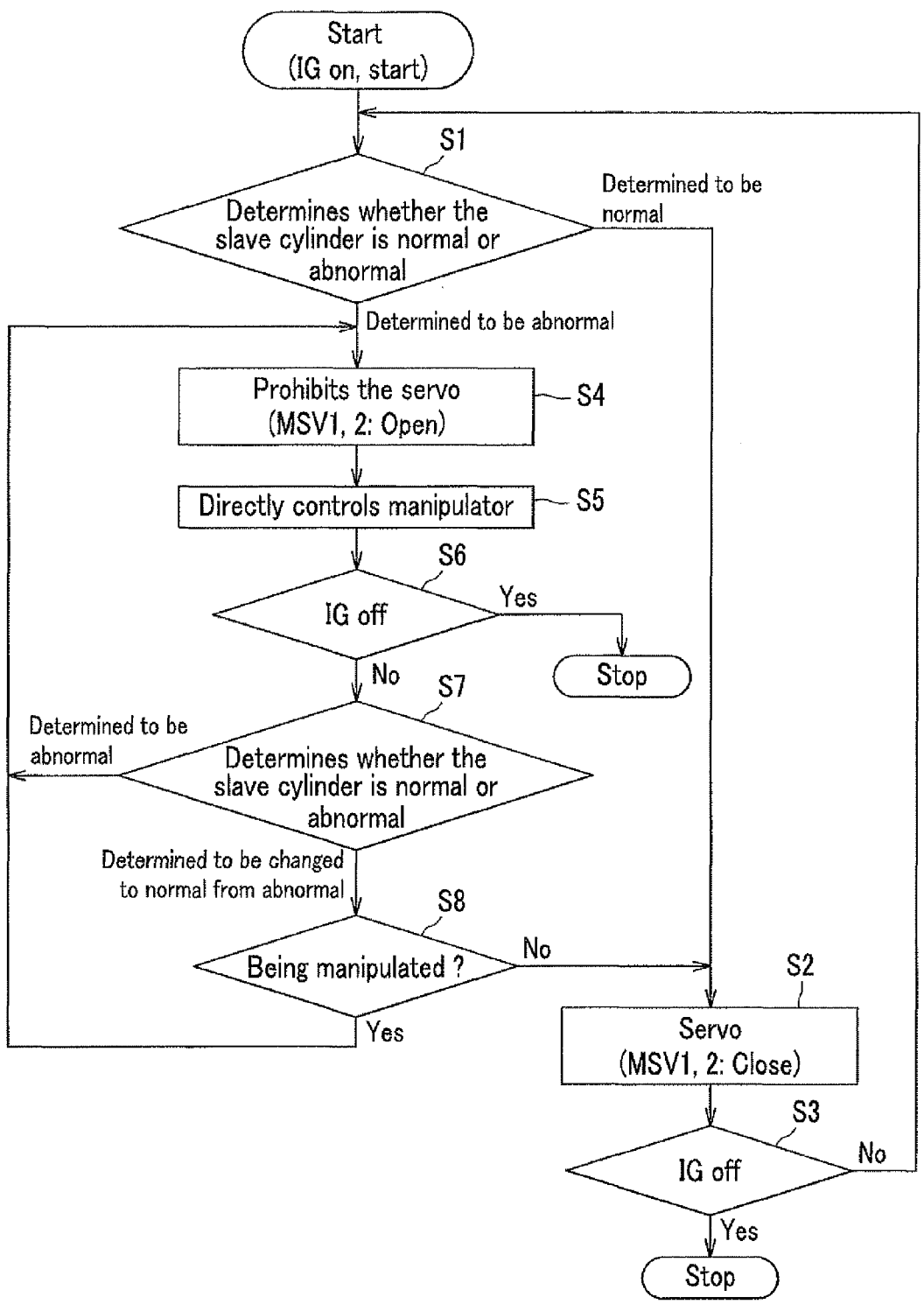
FIG. 2 is a flow diagram indicating a sequence of operations in a process for generating braking force according to the first embodiment.

FIG. 2 is a flow diagram indicating a sequence of operations in a process for generating braking force according to the first embodiment. The braking-force generator 1 is mounted on a vehicle. When an ignition switch (IG) of the vehicle is turned on, the braking-force generator 1 is started, and the process of generating the braking force, which is performed by the braking-force generator 1, starts.

In step S1, the abnormal judgment means 2*b* in the ECU 2 determines whether the slave cylinder S/C (as the hydraulic-pressure generation means) is normal or abnormal. When it is determined in step S1 that the slave cylinder S/C is normal, the operation goes to step S2. On the other hand, when it is determined in step S1 that the slave cylinder S/C is abnormal (i.e., when the slave cylinder S/C is determined to fail) as indicated as "Failure Determined" in FIG. 3, the operation goes to step S4. (FIG. 3 is a timing diagram indicating timings of the operations in the process for generating braking force according to the first embodiment.)

Figure 3:
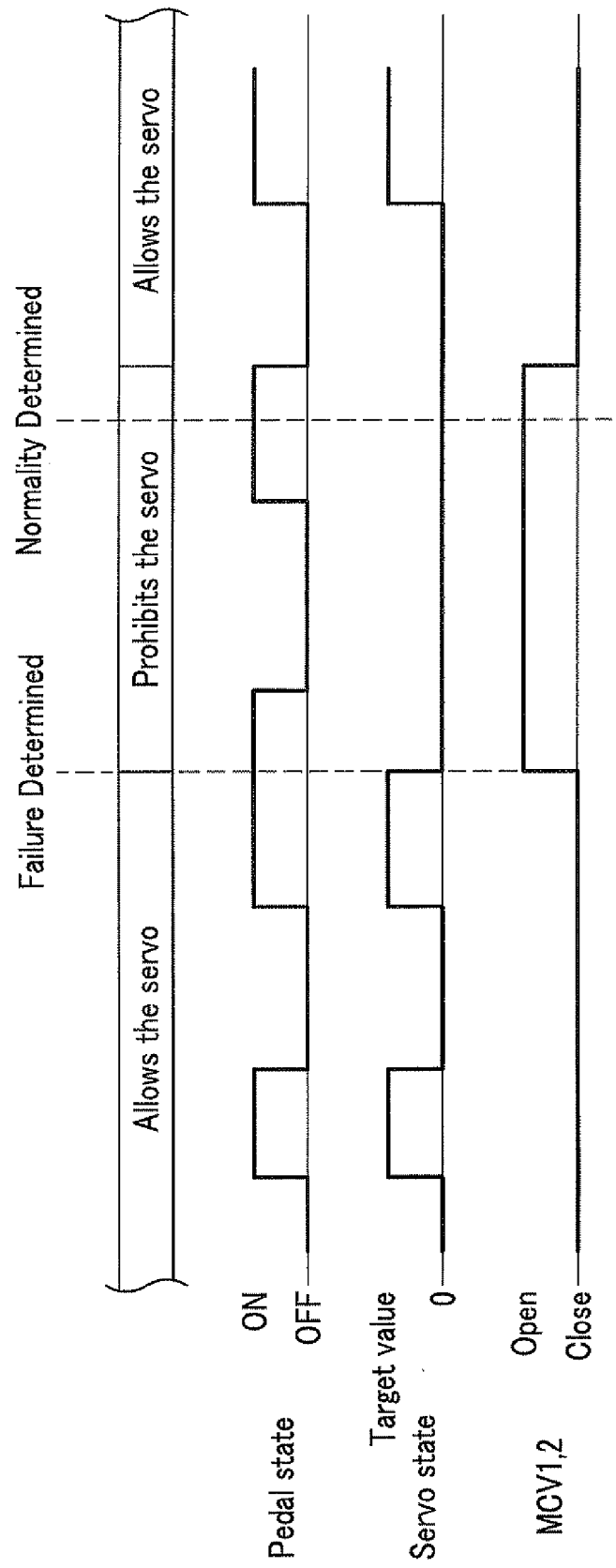
FIG. 3 is a timing diagram indicating timings of the operations in the process for generating braking force according to the first embodiment.

In step S2, as indicated in FIG. 3, the control means 2*a* in the ECU 2 controls the master cut valves MCV1 and MCV2 to be closed and controls the shutoff valve (PFSV) 47 to be opened, although the master cut valves MCV1 and MCV2 are open and the shutoff valve (PFSV) 47 is closed when the slave cylinder S/C (as the hydraulic-pressure generation means) is determined to be abnormal. Then, the control means 2*a* in the ECU 2 controls the slave cylinder S/C to produce braking force by a servo mechanism. As indicated in FIG. 3, when the slave cylinder S/C is normal (before occurrence of an abnormality or failure is determined), the control means 2*a* allows the slave cylinder S/C to perform a servo operation, so that the slave cylinder S/C can generate braking force by the servo operation. Even in the state in which the servo operation is allowed, when the driver does not manipulate the manipulator (the brake pedal 3), i.e., when the pedal state is OFF, no braking force is generated (i.e., the servo state is zero). When the driver manipulates the manipulator (the brake pedal 3), i.e., when the pedal state is ON, a target value is set, and the braking force is generated so as to follow the target value.

In step S3, the control means 2*a* determines whether or not the ignition switch (IG) is turned off. When it is determined that the ignition switch (IG) is turned off (i.e., when yes is determined in step S3), the braking-force generator 1 is shut down, and execution of the process of generating the braking force is stopped (ended). On the other hand, when it is determined that the ignition switch (IG) is not turned off (i.e., when no is determined in step S3), the operation goes back to step S1. Thus, the determination in step Si is repeatedly performed.

When the slave cylinder S/C is determined to be abnormal (i.e., the slave cylinder S/C is determined to fail) in step S1, the control means 2*a* prohibits the servo operation by the slave cylinder S/C in step S4. As indicated in FIG. 3, after the slave cylinder S/C is determined to fail, even when the pedal state is ON, the servo state is zero, and no braking force is generated from the slave cylinder S/C. In addition, in step S4, the control means 2*a* controls the master cut valves MCV1 and MCV2 to be opened, and controls the shutoff valve (PFSV) 47 to be closed.

When the slave cylinder S/C is abnormal, the driver (manipulator) directly controls the braking force by manipulating the brake pedal (manipulator) 3 in step S5.

In step S6, the control means 2*a* determines whether or not the ignition switch (IG) is turned off. When it is determined that the ignition switch (IG) is turned off (i.e., when yes is determined in step S6), the braking-force generator 1 is shut down, and execution of the process of generating the braking force is stopped (ended). On the other hand, when it is determined that the ignition switch (IG) is not turned off (i.e., when no is determined in step S6), the operation goes to step S7.

Although the braking-force generator 1 is determined to be abnormal in step S1 in step S7, the abnormal judgment means 2*b* determines again whether the slave cylinder S/C is normal or abnormal. When it is determined in step S7 that the slave cylinder S/C is normal as indicated as "Normality Determined" in FIG. 3, i.e., when the slave cylinder S/C is determined in step S7 to be restored from the abnormal state to the normal state, the operation goes to step S8. On the other hand, when it is determined in step S7 that the slave cylinder S/C is abnormal (i.e., when the slave cylinder S/C is determined to fail), the operation goes to step S4.

In step S8, the control means 2*a* determines whether or not the brake pedal 3 is being manipulated by the driver. Specifically, the amount of manipulation of the brake pedal 3 is measured by the stroke sensor S1, and the control means 2*a* acquires the amount of manipulation, and determines whether the amount of manipulation is approximately zero (i.e., the brake pedal 3 is not being manipulated) or the amount of manipulation is not approximately zero (i.e., the brake pedal 3 is being manipulated). When it is determined that the brake pedal 3 is being manipulated (i.e., when yes is determined in step S8), the operation goes back to step S4. That is, even when the determination by the abnormality determination unit 2*b* changes from abnormality to normality while the brake pedal 3 is being manipulated, the servo operation using the slave cylinder S/C is prohibited until the manipulation is terminated. As indicated in FIG. 3, the servo operation is not performed until the manipulation is terminated, even after the normality is determined. Thus, the total braking force which is actually exerted on the wheels of the vehicle does not increase regardless of the intention of the driver at the timing at which the normality is determined (i.e., at which the slave cylinder S/C is automatically restored), so that the driver will not feel a sense of incongruity. On the other hand, when it is determined that the brake pedal 3 is not being manipulated (i.e., when no is determined in step S8), the operation goes back to step S2.

In the above operations in step S8, when the amount of manipulation of the brake pedal 3 is approximately zero, the brake pedal 3 is determined not to be being manipulated. The amount of manipulation of the brake pedal 3 becomes approximately zero when the driver is substantially detached from the manipulator. Therefore, in step S8, the prohibition of the servo operation is continued until the driver is substantially detached from the manipulator. Even when a servo operation is performed and a kickback occurs after the driver is substantially detached from the brake pedal 3, the kickback is not transmitted to the driver, so that the driver will not feel a sense of incongruity.

2. Second Embodiment

Figure 4:
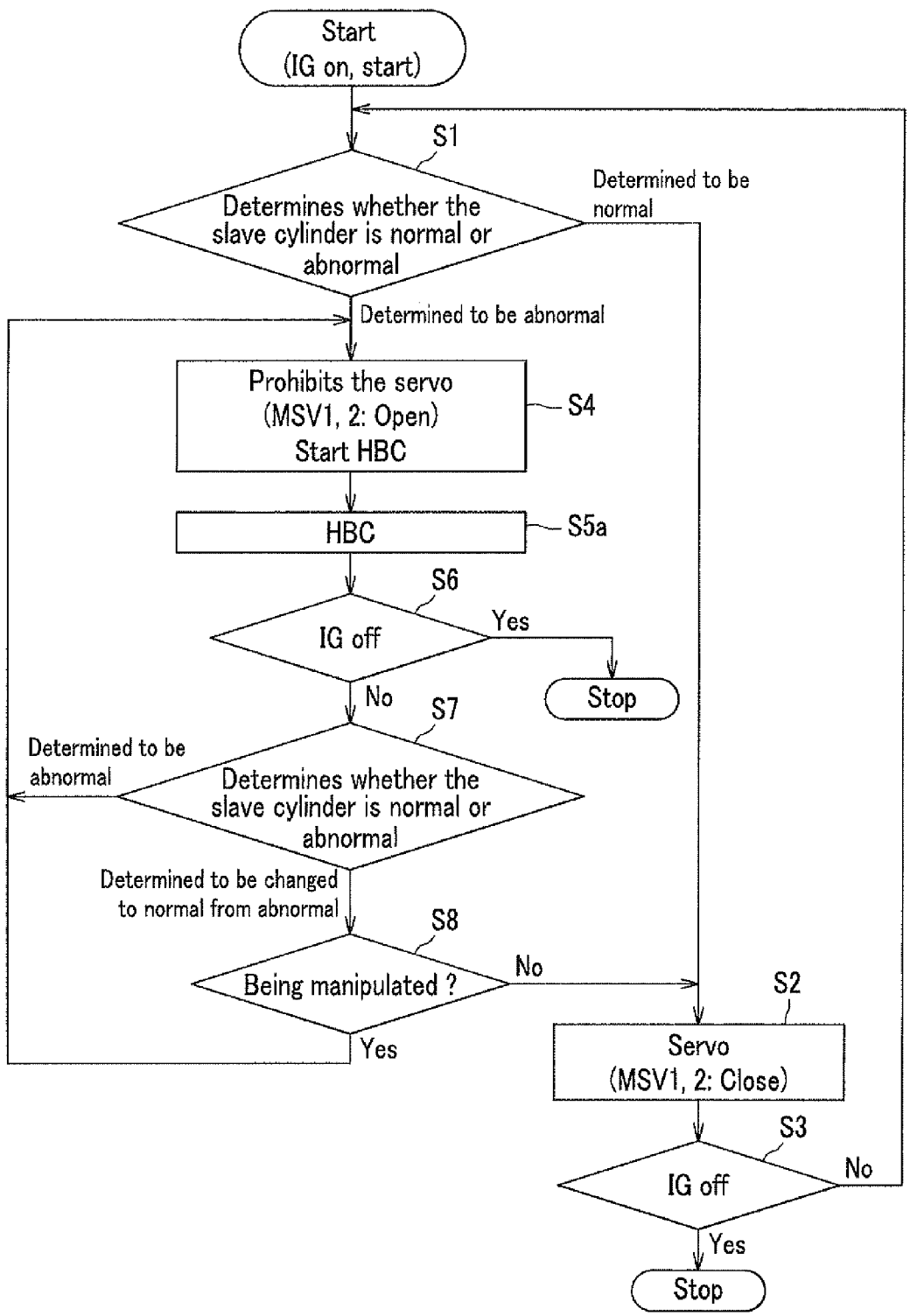
FIG. 4 is a flow diagram indicating a sequence of operations in a process for generating braking force according to a second embodiment of the present invention.

FIG. 4 is a flow diagram indicating a sequence of operations in a process for generating braking force according to the second embodiment of the present invention. The braking-force generator 1 according to the first embodiment can also be used in the second embodiment. However, in the second embodiment, the pump 90 in the vehicle stability assist VSA is used as a braking-force assist device having a function of a hydro-booster control (HBC) which generates auxiliary braking force. The auxiliary braking force supplements the braking force which is generated in the master cylinder M/C by the driver manipulating the brake pedal 3. In the second embodiment, the vehicle stability assist VSA functions as the aforementioned control system for stabilization of the vehicle motion when the braking-force generator 1 is normal, and does not function when the braking-force generator 1 is abnormal. Therefore, in the second embodiment, the pump 90 in the vehicle stability assist VSA is used as the above braking-force assist device (HBC) only when the braking-force generator 1 is abnormal. Since the pump 90 is driven by the motor M, the motor M is also used for the braking-force assist device (HBC). When the braking-force generator 1 is determined to fail, the control means 2*a* increases the hydraulic pressure in the hydraulic path 81 and the like by using the pump 90 and the motor M so as to boost the braking force generated in the master cylinder M/C. Alternatively, it is possible to use another pump or an accumulator instead of the pump 90 as long as the other pump or the accumulator functions as the braking-force assist device (HBC).

Figure 5:
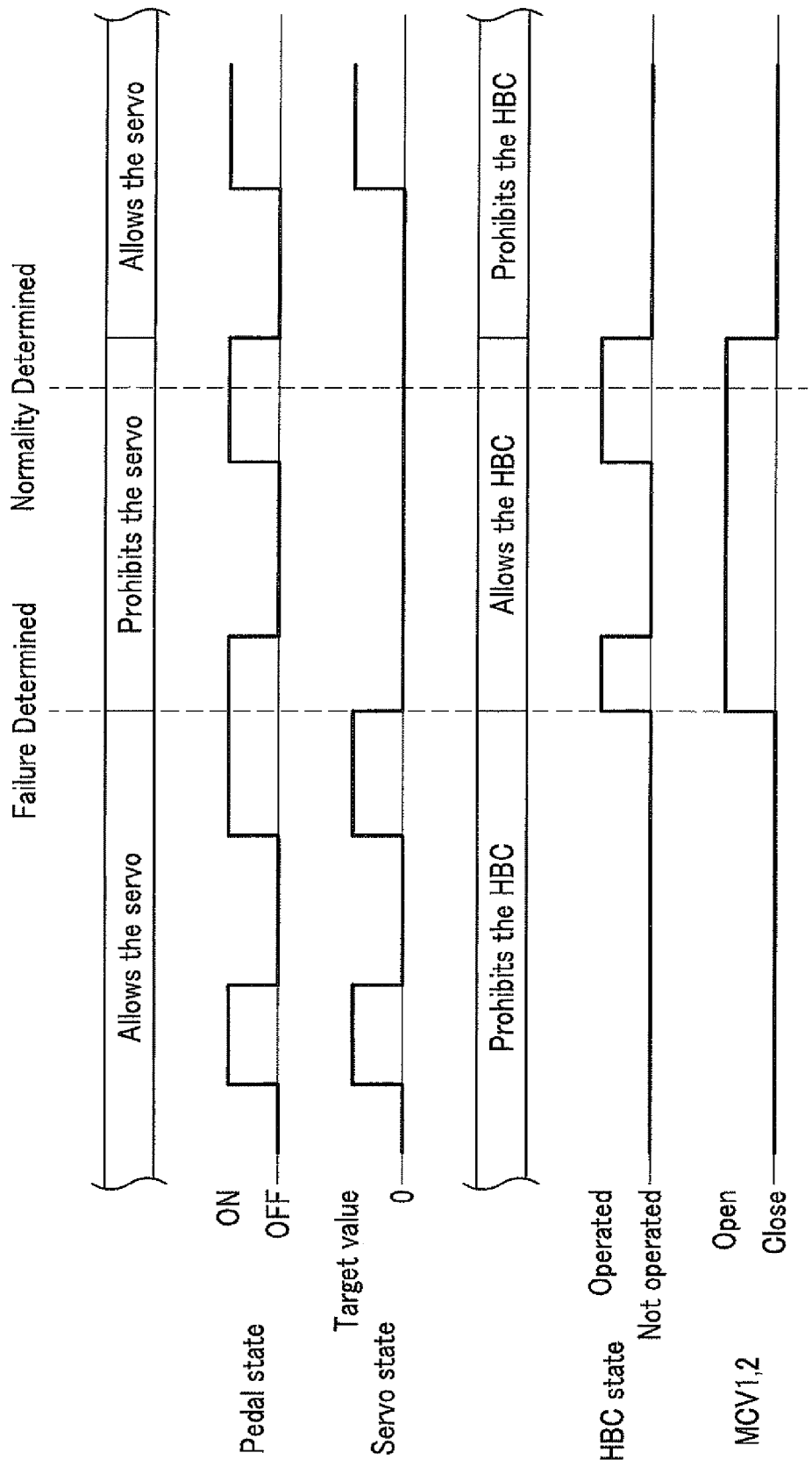
FIG. 5 is a timing diagram indicating timings of the operations in the process for generating braking force according to the second embodiment.

Steps S1 to S3 and S6 to S8 in the sequence according to the second embodiment indicated in FIG. 4 are identical to steps S1 to S3 and S6 to S8 in the sequence according to the first embodiment indicated in FIG. 2. Therefore, the explanations on steps S1 to S3 and S6 to S8 are not repeated. The second embodiment is different from the first embodiment in steps S4*a* and S5*a*. According to the second embodiment, the braking-force assist device (HBC) starts in step S4*a*. FIG. 5 is a timing diagram indicating timings of the operations in the process for generating braking force according to the second embodiment. As indicated in FIG. 5, the control means 2*a* allows the HBC to operate in step S4*a* (i.e., immediately after the determination of the failure), although the operation of the HBC is prohibited before the determination of the failure. In step S4*a*, the pump 90, together with the motor M, starts the operation as the braking-force assist device (HBC), and generates the auxiliary braking force. In addition, (when the slave cylinder S/C is abnormal,) in step S5*a*, the control means 2*a* causes the pump 90 to generate the auxiliary braking force by controlling the motor M for the HBC, so that the braking force generated in the master cylinder M/C by the driver is boosted by the HBC. When it is determined by the abnormality determination unit 2*b* in step S7 that the condition of the slave cylinder S/C changes from abnormality to normality, and it is determined in step S8 that the brake pedal 3 is being manipulated (i.e., yes is determined in step S8), the operation goes back to step S4*a*, and the operation of the HBC is performed. Therefore, as indicated in FIG. 5, until the manipulation of the brake pedal 3 is terminated, (the allowance of) the operation of the HBC is continued, i.e., the state in which the auxiliary braking force is generated by the pump 90 and the like is maintained. Thus, the total braking force which is actually exerted on the wheels of the vehicle does not vary (decrease) regardless of the intention of the driver at the timing at which the normality of the slave cylinder S/C is determined, so that the driver will not feel a sense of incongruity.

3. Third Embodiment

Figure 6:
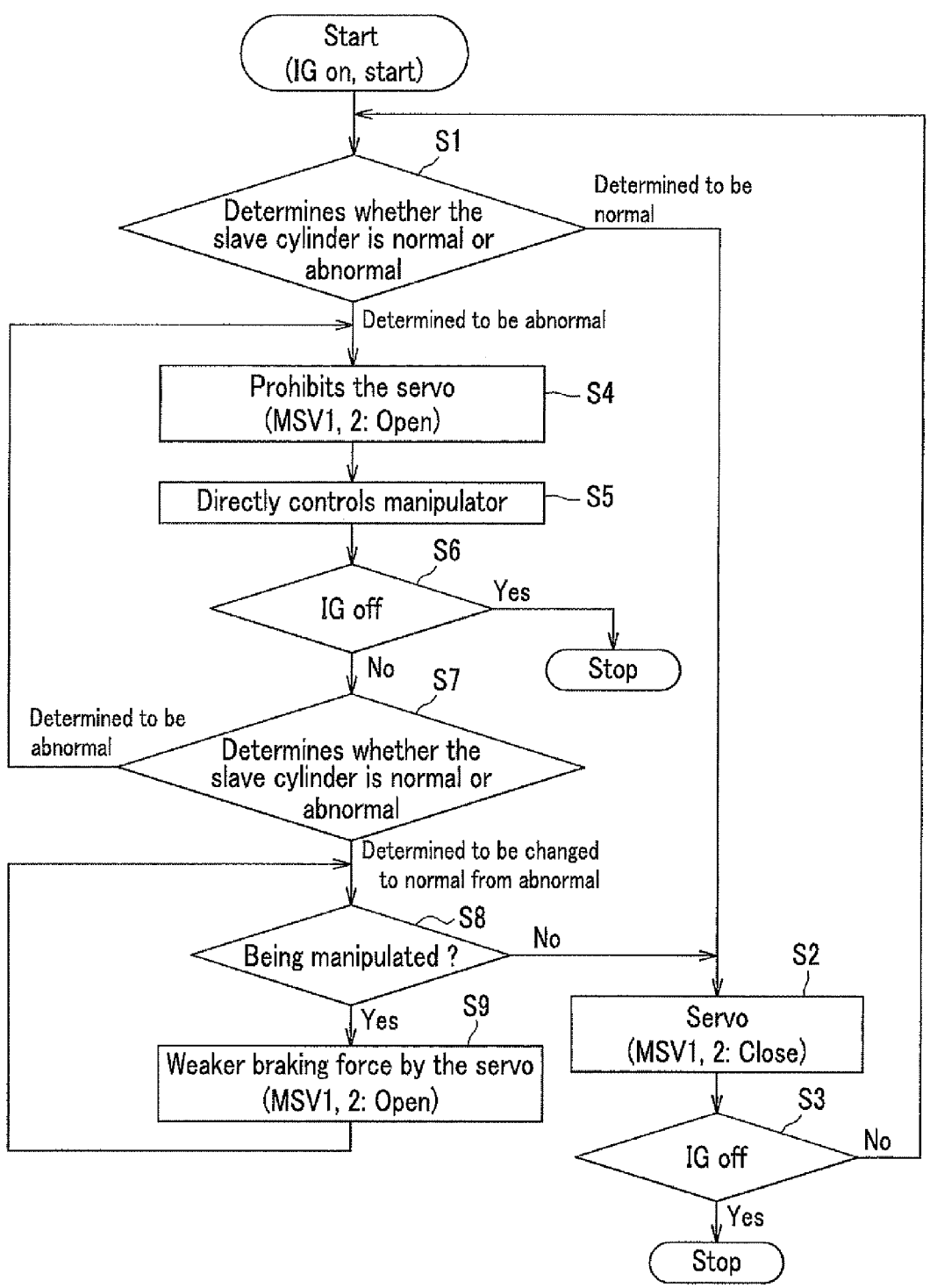
FIG. 6 is a flow diagram indicating a sequence of operations in a process for generating braking force according to a third embodiment of the present invention.

FIG. 6 is a flow diagram indicating a sequence of operations in a process for generating braking force according to the third embodiment of the present invention. The braking-force generator 1 according to the first embodiment can also be used in the third embodiment. Steps S1 to S8 in the sequence according to the third embodiment indicated in FIG. 6 are identical to steps S1 to S8 in the sequence according to the first embodiment indicated in FIG. 2. Therefore, the explanations on steps S1 to S8 are not repeated. However, the process for generating braking force in the third embodiment further includes step S9, which is performed when yes is determined in step S8.

Figure 7:
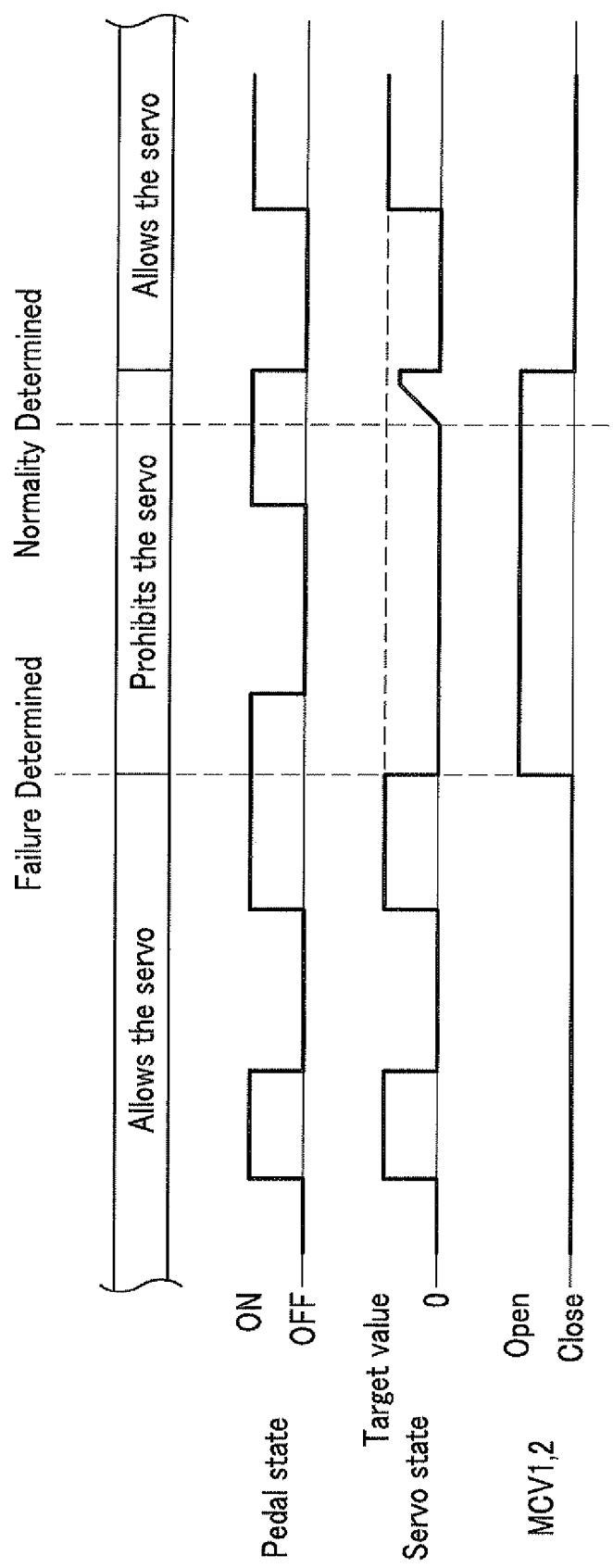
FIG. 7 is a timing diagram indicating timings of the operations in the process for generating braking force according to the third embodiment.

When the determination by the abnormality determination unit 2*b* in step S7 changes from abnormality to normality, and the brake pedal 3 is determined in step S8 to be being manipulated (i.e., yes is determined in step S8), in step S9, the control means 2*a* performs a servo operation for generating braking force which is weaker than the braking force generated by the servo operation in step S2. FIG. 7 is a timing diagram indicating timings of the operations in the process for generating braking force according to the third embodiment. As indicated in the plot of the servo state in FIG. 7, it is possible to start a servo operation immediately after the determination of normality (i.e., immediately after the determination in step S7 changes from abnormality to normality). Since the braking force generated in the slave cylinder S/C by the above servo operation in step S9 is weak, the braking force which the driver feels is not greatly increased, so that the sense of incongruity which the driver feels can be suppressed.

In addition, since the operation goes back to step S8 after execution of step S9, it is possible to continue the servo operation in step S9 until the manipulation of the brake pedal 3 is terminated (i.e., until no is determined in step S8).

Further, in step S9, the control means 2*a* in the ECU 2 controls the master cut valves MCV1 and MCV2 to be opened and controls the shutoff valve 47 to be closed. Therefore, the driver directly generates braking force in step S9 as in step S5. In this sense, the braking force generated in the slave cylinder S/C in step S9 can be regarded as auxiliary braking force which supplements the braking force generated by the driver.

What is claimed is:

1. A braking-force generator comprising:
    a master cylinder which generates first braking force corresponding to an operational input through a manipulator;
    a hydraulic-pressure generating means which is connected to the master cylinder through a shutoff valve in such a manner that the hydraulic-pressure generating means can be shut off from the master cylinder, and generates second braking force corresponding to the operational input through the manipulator when the hydraulic-pressure generating means is shut off from the master cylinder;
    an abnormality determination means which repeatedly determines whether or not an operational state of the hydraulic-pressure generating means is abnormal; and
    a control means which opens the shutoff valve and controls to prohibit generation of the second braking force by the hydraulic-pressure generating means so as to transmit to the hydraulic-pressure generating means the first braking force generated by the master cylinder, when the operational state is determined to be abnormal;
    wherein in the case where the abnormality determination means determines that the operational state changes from an abnormal state to a normal state while manipulation with the manipulator is being performed, the control means keeps to control the shut off valve open and controls to keep prohibition of generation of the second braking force by the hydraulic-pressure generating means until the manipulation is terminated.

2. The braking-force generator according to claim 1, further comprising a braking-force assist device which generates auxiliary braking force for supplementing the first braking force generated by the master cylinder when the operational state is determined to be abnormal, and in the case where the abnormality determination means determines that the operational state changes from the abnormal state to the normal state while manipulation with the manipulator is being performed, the control means controls the braking-force assist device to keep generation of the auxiliary braking force until the manipulation is terminated.

3. The braking-force generator according to claim 2, wherein the control means keeps prohibition of generation of the second braking force until an operator is detached from the manipulator.

4. A braking-force generator comprising:
a master cylinder which generates first braking force corresponding to an operational input through a manipulator;
a hydraulic-pressure generating means which is connected to the master cylinder through a shutoff valve in such a manner that the hydraulic-pressure generating means can be shut off from the master cylinder, and generates second braking force corresponding to the operational input through the manipulator when the hydraulic-pressure generating means is shut off from the master cylinder;
an abnormality determination means which repeatedly determines whether or not an operational state of the hydraulic-pressure generating means is abnormal; and
a control means which opens the shutoff valve and controls to prohibit generation of the second braking force by the hydraulic-pressure generating means so as to transmit to the hydraulic-pressure generating means the first braking force generated by the master cylinder, when the operational state is determined to be abnormal;
wherein in the case where the abnormality determination means determines that the operational state changes from an abnormal state to a normal state while manipulation with the manipulator is being performed, the control means keeps to control the shutoff valve open, and controls to suppress the hydraulic-pressure generating means in such a manner that the hydraulic-pressure generating means generates third braking force which is smaller than the second braking force generated when the shutoff valve is closed, until the manipulation is terminated.

* * * * *